(12) United States Patent
Kim et al.

(10) Patent No.: US 10,804,550 B2
(45) Date of Patent: Oct. 13, 2020

(54) HUMIDIFIER FOR FUEL CELL

(71) Applicants: HYUNDAI MOTOR COMPANY, Seoul (KR); KIA MOTORS CORPORATION, Seoul (KR)

(72) Inventors: Hyun Yoo Kim, Seoul (KR); Chang Ha Lee, Yongin-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 224 days.

(21) Appl. No.: 16/175,211

(22) Filed: Oct. 30, 2018

(65) Prior Publication Data

US 2020/0058948 A1 Feb. 20, 2020

(30) Foreign Application Priority Data

Aug. 20, 2018 (KR) .................. 10-2018-0096910

(51) Int. Cl.
*H01M 8/04* (2016.01)
*H01M 8/04119* (2016.01)
*H01M 8/04828* (2016.01)
*B01D 69/08* (2006.01)
*B01D 63/04* (2006.01)

(52) U.S. Cl.
CPC ... *H01M 8/04149* (2013.01); *H01M 8/04141* (2013.01); *H01M 8/04835* (2013.01); *B01D 63/04* (2013.01); *B01D 69/08* (2013.01)

(58) Field of Classification Search
CPC ......... H01M 8/04141; H01M 8/04007; H01M 8/04126; H01M 8/04029; B01D 63/02
See application file for complete search history.

(56) References Cited

U.S. PATENT DOCUMENTS

| | | | | | |
|---|---|---|---|---|---|
| 5,352,361 | A | * | 10/1994 | Prasad | B01D 53/22 210/321.81 |
| 7,223,339 | B2 | * | 5/2007 | Nakamatsu | B01D 63/02 210/321.81 |
| 7,608,185 | B2 | * | 10/2009 | Liao | B01D 61/364 202/175 |
| 7,871,520 | B2 | * | 1/2011 | Ma | B01D 63/02 210/640 |
| 9,795,923 | B2 | * | 10/2017 | Inuzuka | B01D 63/04 |
| 9,802,842 | B2 | | 10/2017 | Shiki | |

(Continued)

FOREIGN PATENT DOCUMENTS

JP 2007-207607 A 8/2007
JP 2007-323982 A 12/2007

(Continued)

*Primary Examiner* — Stephen Hobson
(74) *Attorney, Agent, or Firm* — Morgan, Lewis & Bockius LLP

(57) ABSTRACT

A humidifier for a fuel cell includes: a bundle of hollow fiber membranes disposed therein, such that an intake gas flows inside the bundle of hollow fiber membranes; a housing configured to accommodate the bundle of hollow fiber membranes, such that an exhaust gas, which has a higher humidity than the intake gas, flows inside the housing; and a guide member disposed in the housing to restrict a movement of the bundle of hollow fiber membranes inside the housing. Coolant flows through the guide member to cool the exhaust gas to promote condensation of the exhaust gas.

14 Claims, 5 Drawing Sheets

(56) References Cited

U.S. PATENT DOCUMENTS

| | | | |
|---|---|---|---|
| 2003/0080447 A1* | 5/2003 | Ye ............................ | F24F 6/02 |
| | | | 261/115 |
| 2004/0211726 A1* | 10/2004 | Baig ........................ | C02F 1/44 |
| | | | 210/640 |
| 2011/0053012 A1 | 3/2011 | Lee et al. | |
| 2019/0081335 A1* | 3/2019 | Shinozaki ......... | H01M 8/04708 |
| 2019/0326618 A1* | 10/2019 | Oh .................... | H01M 8/04835 |

FOREIGN PATENT DOCUMENTS

| | | |
|---|---|---|
| KR | 10-2009-0097982 A | 9/2009 |
| KR | 10-2011-0021599 A | 3/2011 |
| KR | 10-2012-0106314 A | 9/2012 |

* cited by examiner

HUMIDIFIER FOR FUEL CELL

CROSS-REFERENCE TO RELATED APPLICATION

This application is claims the benefit of priority to Korean Patent Application No. 10-2018-0096910, filed in the Korean Intellectual Property Office on Aug. 20, 2018, the entire contents of which are incorporated herein by reference.

TECHNICAL FIELD

The present disclosure relates to a humidifier for a fuel cell, and more particularly, to a fuel cell humidifier including a coolant passage for cooling.

BACKGROUND

Fuel cell systems, which continually produce electrical energy through an electro-chemical reaction of fuel continuously supplied thereto, have been consistently studied and developed as an alternative for solving global environmental problems.

The fuel cell systems may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like according to the types of electrolytes used and may be employed in various applications, such as mobile power supply, transportation, distributed power generation, and the like, according to operating temperatures and output ranges along with the types of fuels used.

Among the fuel cells mentioned above, the PEMFC is applied to the field of a hydrogen vehicle (a hydrogen fueled cell vehicle) that is being developed to replace an internal combustion engine.

The hydrogen vehicle is configured to travel by producing electricity through an electro-chemical reaction of hydrogen and oxygen and driving a motor with the electricity produced. The hydrogen vehicle has a structure that includes a hydrogen tank for storing hydrogen (H2), a fuel cell stack (FC stack) for producing electricity through an oxidation/reduction reaction of hydrogen ($H_2$) and oxygen (O2), various devices for draining water produced, a battery for storing the electricity produced by the fuel cell stack, a controller for converting and controlling the electricity produced, a motor for generating a driving force, and the like.

The fuel cell stack refers to a fuel cell body having tens or hundreds of cells stacked one above another in series. The fuel cell stack has a structure in which a plurality of cells are stacked between end plates, each cell including an electrolyte membrane that divides the interior of the cell into two parts, an anode located on one side of the electrolyte membrane, and a cathode located on the other side thereof.

A separator is disposed between the cells to restrict flow paths of hydrogen and oxygen. The separator is made of a conductor to move electrons during an oxidation/reduction reaction.

When hydrogen is supplied to the anode, the hydrogen is divided into hydrogen ions and electrons by a catalyst. The electrons produce electricity while moving outside the fuel cell stack through the separator. The hydrogen ions pass through the electrolyte membrane and move to the cathode, after which the hydrogen ions are combined with oxygen supplied from ambient air and electrons to produce water, and the water produced is discharged to the outside.

The PEMFC may maintain power generation efficiency only if an appropriate moisture content is maintained by supplying a predetermined amount of moisture to a polymer electrolyte membrane of a membrane-electrode assembly (MEA).

A fuel cell system may include a humidifier in order to humidify an intake gas that flows into a fuel cell stack.

The fuel cell humidifier may be configured to humidify the intake gas flowing into the fuel cell stack using an exhaust gas that is discharged from the fuel cell stack. The exhaust gas discharged from the fuel cell stack has a higher humidity than the intake gas since the exhaust gas contains moisture produced by an electro-chemical reaction in the fuel cell stack.

While the fuel cell is in operation, the temperature inside the fuel cell rises, and the exhaust gas is also discharged at high temperature and high humidity from the fuel cell stack.

Therefore, in order to improve the performance of the fuel cell humidifier that humidifies the intake gas using the exhaust gas, it is necessary to effectively lower the temperature inside the humidifier, that is, the temperature of the exhaust gas.

SUMMARY

The present disclosure has been made to solve the above-mentioned problems occurring in the prior art while advantages achieved by the prior art are maintained intact.

An aspect of the present disclosure provides a fuel cell humidifier that cools an exhaust gas flowing into the humidifier to promote condensation of the exhaust gas, thereby improving humidification performance.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a humidifier for a fuel cell includes: a bundle of hollow fiber membranes disposed therein, such that an intake gas flows inside the bundle of hollow fiber membranes; a housing configured to accommodate the bundle of hollow fiber membranes, such that an exhaust gas, which has a higher humidity than the intake gas, flows inside the housing; and a guide member disposed in the housing to restrict a movement of the bundle of hollow fiber membranes inside the housing. Coolant flows through the guide member to cool the exhaust gas to promote condensation of the exhaust gas.

According to another aspect of the present disclosure, a humidifier for a fuel cell includes: a bundle of hollow fiber membranes disposed therein such that an intake gas flows inside the bundle of hollow fiber membranes; a housing accommodating the bundle of hollow fiber membranes, such that an exhaust gas, which has a higher humidity than the intake gas, flows inside the housing; and a guide member disposed in the housing to restrict a movement of the bundle of hollow fiber membranes inside the housing. The guide member includes a plurality of guide plates, which extend in a direction transverse to the bundle of hollow fiber membranes and each of which has a coolant passage inside. The plurality of guide plates are sequentially connected together in a screw shape and each of the plurality of guide plates has an exhaust gas passage therebetween. The guide member guides the exhaust gas to helically flow along an inner surface of the housing.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
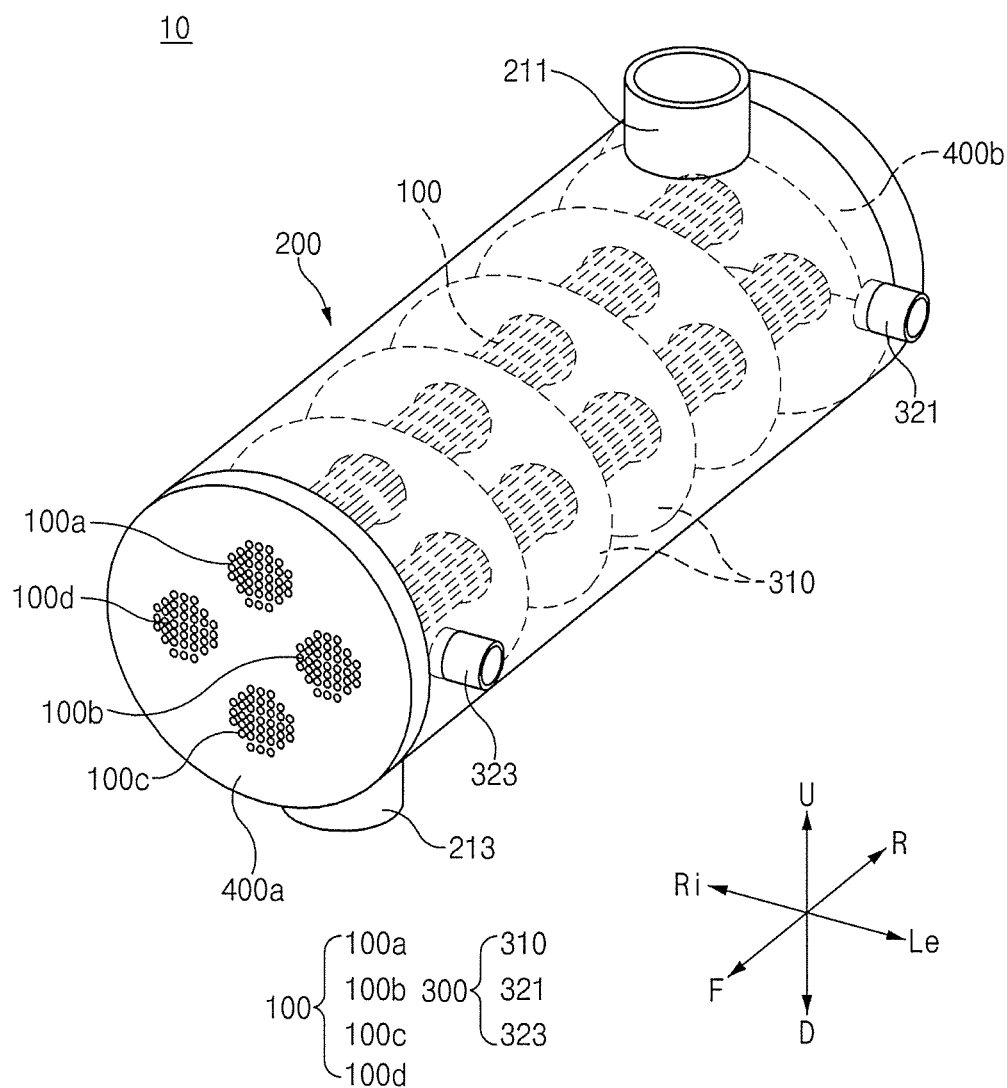
FIG. 1 is a perspective view of a fuel cell humidifier according to an embodiment of the present disclosure.

Hereinafter, exemplary embodiments of the present disclosure will be described in detail with reference to the accompanying drawings. It should be understood that even if shown in different drawings, identical elements are provided with identical reference numerals in the drawings. Furthermore, in describing the embodiments of the present disclosure, detailed descriptions related to well-known functions or configurations will be omitted when they may make subject matters of the present disclosure unnecessarily obscure.

Hereinafter, the terms "up (U), down (D), front (F), rear (R), left (Le), and right (Ri)" are defined as illustrated in the drawings. However, this is only for the convenience of description, and the terms "up (U), down (D), front (F), rear (R), left (Le), and right (Ri)" may be defined differently from those illustrated in the drawings.

FIG. 1 is a perspective view of a fuel cell humidifier according to an embodiment of the present disclosure.

The fuel cell humidifier 10 according to an embodiment of the present disclosure may include bundles of hollow fiber membranes 100, a housing 200, and a guide member 300.

The bundles of hollow fiber membranes 100 may each include a plurality of hollow fiber membranes through which to pass an intake gas to be introduced into a fuel cell stack (not illustrated). Each of the plurality of hollow fiber membranes may be in communication with the outside of the housing 200 at opposite ends thereof.

The bundles of hollow fiber membranes 100 may be spaced apart from each other by a predetermined distance, each of which has a large contact surface with an exhaust gas, improving the ability to humidify the intake gas.

The bundles of hollow fiber membranes 100 may extend in a front to back direction. The bundles of hollow fiber membranes 100 may be fixed to the housing 200 at the front and rear ends thereof by potting layers 400a and 400b.

The housing 200 may have an inner space in which to accommodate the bundles of hollow fiber membranes 100 and the guide member 300.

The housing 200 may be configured such that an exhaust gas discharged from the fuel cell stack (not illustrated) and having a higher humidity than the intake gas flows through the housing 200. Accordingly, moisture in the exhaust gas may be condensed on and infiltrated into the bundles of hollow fiber membranes 100 to humidify the intake gas.

The housing 200 may have a hollow cylindrical shape that extends in the front to back direction and is open at front and rear ends 201 and 203 thereof.

The housing 200 may have an exhaust gas inlet 211 for guiding the exhaust gas that is introduced into the housing 200 and an exhaust gas outlet 213 for guiding the exhaust gas that is discharged from the housing 200.

The exhaust gas inlet 211 may be formed on a side surface of the housing 200 and may extend outward from the side surface of the housing 200.

The exhaust gas outlet 213 may be formed on the side surface of the housing 200 and may extend outward from the side surface of the housing 200.

The guide member 300 may be located in the housing 200 to restrict a movement of the bundles of hollow fiber membranes 100 inside the housing 200.

The guide member 300 may be configured such that coolant flows through the guide member 300 to cool the exhaust gas, thereby promoting condensation of the exhaust gas.

In an embodiment, the guide member 300 may promote infiltration of condensate on the surface of the guide member 300 into the bundles of hollow fiber membranes 100.

A fuel cell humidifier in the related art has a problem in that condensate produced by condensation of an exhaust gas is not sufficiently cooled or formed on surfaces of hollow fiber membranes due to high temperature inside the humidifier, and therefore, it is difficult to improve the performance of the humidifier. In addition, the fuel cell humidifier in the related art has a problem in that the condensate produced by the condensation of the exhaust gas is formed on a wall or a lower end of a housing of the humidifier and thus is not actually used to humidify an intake gas that flows through the hollow fiber membranes.

The fuel cell humidifier 10 according to an embodiment of the present disclosure is intended to promote condensation of a high-humidity exhaust gas flowing through the humidifier 10, thereby improving humidification performance. More specifically, the basic feature of the fuel cell humidifier 10 according to an embodiment of the present disclosure is characterized in that the guide member 300 includes a coolant passage therein, through which coolant flows, in order to cool the exhaust gas and thereby promote the condensation of the exhaust gas.

Features of the fuel cell humidifier 10 according to an embodiment of the present disclosure will be described below in more detail.

Figure 2:
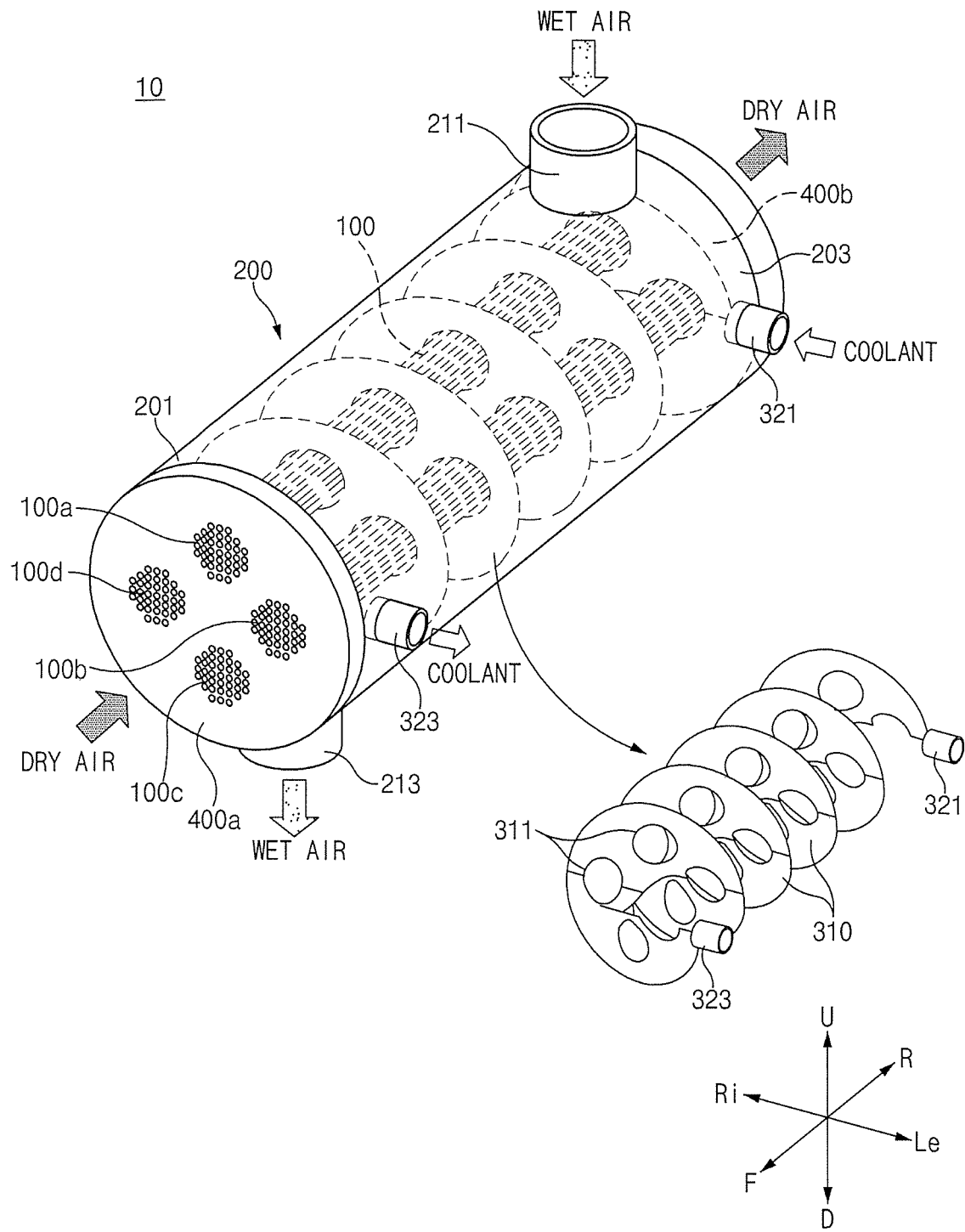
FIG. 2 is a view illustrating a guide member of the humidifier in FIG. 1.
Figure 3:
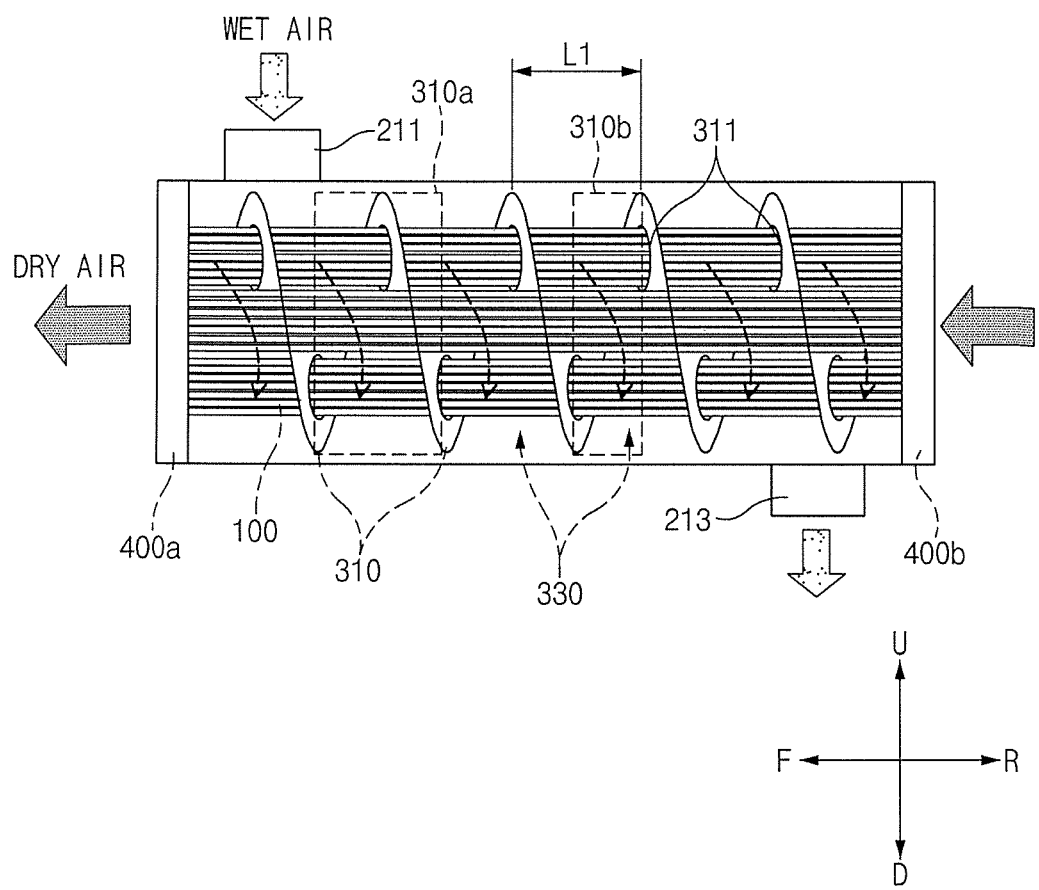
FIG. 3 is a side view of the humidifier in FIG. 1.
Figure 4:
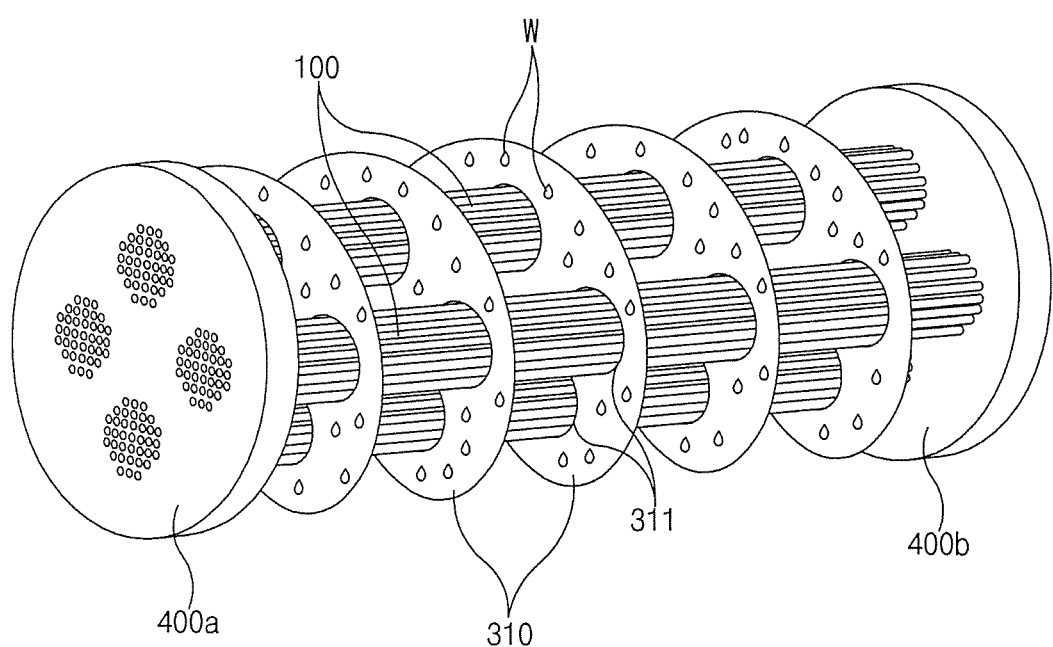
FIG. 4 is a view illustrating a part of the humidifier in FIG. 1.
Figure 5:
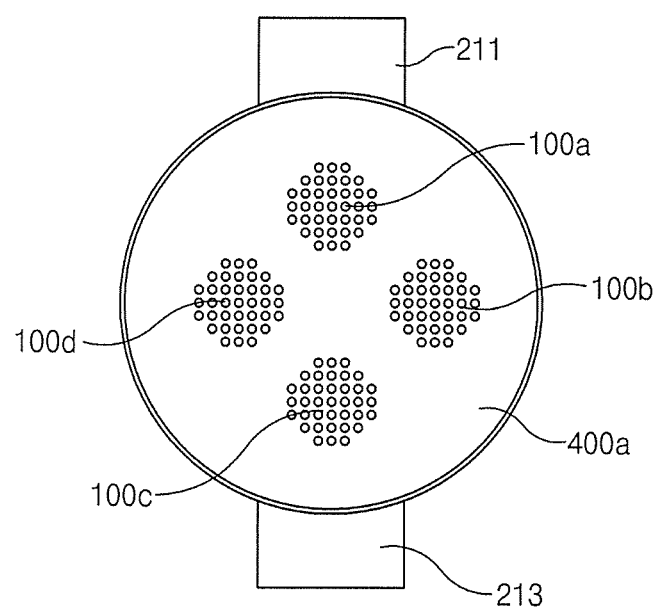
FIG. 5 is a front view of the humidifier in FIG. 1.

FIG. 2 is a view illustrating the guide member of the humidifier in FIG. 1. FIG. 3 is a side view of the humidifier in FIG. 1. FIG. 4 is a view illustrating a part of the humidifier in FIG. 1. FIG. 5 is a front view of the humidifier in FIG. 1.

Referring to FIG. 2, the guide member 300 may extend inside the housing 200 in the front to back direction in which the housing 200 extends. Accordingly, the guide member 300 may be located over a wide area inside the housing 200 and may lower the temperature inside the housing 200. In addition, the guide member 300 may increase the contact area with the exhaust gas to effectively cool the exhaust gas, thereby promoting production of condensate.

The guide member 300 may have a helical shape along the inner surface of the housing 200. That is, the guide member 300 may have a three-dimensional, helical shape that extends in the front to back direction and has regions overlapping each other in the front to back direction.

The guide member 300 may include a plurality of guide plates 310 that extend in transverse directions (e.g., up/down directions or left/right directions) that are transverse to the bundles of hollow fiber membranes 100, and have coolant passages therein.

The plurality of guide plates 310 may have a plate shape that extends in the up/down directions and the left/right directions. Here, the up/down directions or the left/right directions may include directions that foam a predetermined angle with the up/down directions or the left/right directions defined as illustrated in the drawings. That is, as used herein, the up/down directions or the left/right directions, in which the plurality of guide plates 310 extend, may be defined as including directions that have a tendency to extend upward and downward or leftward and rightward in a broad sense, rather than up/down directions or left/right directions in a restrictive sense.

Among the plurality of guide plates 310, adjacent guide plates 310 may be connected together to form a screw shape, and an exhaust gas passage may be formed between the guide plates 310. Accordingly, the exhaust gas inside the housing 200 may be guided by the guide member 300 to flow in a helix along the inner surface of the housing 200.

The guide member 300 with a helical shape will be described below in more detail.

The guide member 300 may be configured such that the projection of the guide member 300 from front to back has a circular shape. In this case, the projection may have a diameter equal to or smaller than the inner diameter of the housing 200, and an exhaust gas passage 330 through which the exhaust gas flows may be formed in the housing 200 by combining the guide member 300 and the housing 200.

Referring to FIG. 3, the guide member 300 may be shaped such that the projection of the guide member 300 in the fore or aft direction or in the left or right direction fo ms a sine curve. That is, the guide member 300 may have a shape in which the plurality of guide plates 310 are repeated at predetermined intervals.

In this case, the guide plates 310 may be spaced at predetermined intervals L1 from each other.

Although the guide member 300 has been described herein as including the plurality of guide plates 310, this is only for the convenience of description, and the guide member 300 may actually have a single screw shape in which the plurality of guide plates 310 are connected together. Therefore, boundaries between the guide plates 310 may be arbitrarily determined.

Referring to FIG. 3, for example, the boundaries between the plurality of guide plates 310 may be determined such that a section between two highest points adjacent to each other serves as one guide plate 310 (see reference numeral 310a of FIG. 3). In this case, the guide member 300 may have a shape in which the guide plates 310 with the same shape are repeated.

Alternatively, the boundaries between the plurality of guide plates 310 may be determined such that a section between a highest point and a lowest point adjacent to each other serves as one guide plate 310 (see reference numeral 310b of FIG. 3). In this case, the guide member 300 may have a shape in which two guide plates 310 symmetric to each other when viewed from the side are alternately repeated. In another example, the guide member 300 may have a shape in which the guide plates 310 with the same shape are alternately rotated through an angle of 180 degrees and connected together when viewed from the front.

The plurality of guide plates 310 may have, in the centers thereof, guide holes 311 through which the bundles of hollow fiber membranes 100 pass.

The guide holes 311 may be formed at corresponding locations in the plurality of guide plates 310 such that the bundles of hollow fiber membranes 100 pass through the guide holes 311 at one time.

As many guide holes 311 as the bundles of hollow fiber membranes 100 may be faulted in each of the guide plates 310.

That is, the plurality of guide holes 311 may be formed in the plurality of guide plates 310 such that the projection of the guide member 300 from front to back is the same as the projection of one guide plate 310 from front to back.

Accordingly, the guide member 300 may restrict the bundles of hollow fiber membranes 100 from moving inside the housing 200. When the humidifier 10 is in operation, the bundles of hollow fiber membranes 100 may depart from the original positions thereof due to a gas flow inside the housing 200 or infiltration of moisture in the exhaust gas into the hollow fiber membranes. However, the guide member 300 may restrict the bundles of hollow fiber membranes 100 from moving inside the housing 200, thereby improving a humidification effect of the humidifier 10.

Referring to FIG. 3, a flow of wet air may be guided by the guide member 300 inside the housing 200, and the wet air may flow in a helix along the inner surface of the housing 200. That is, the spaces between the guide plates 310 may form a flow passage to guide the flow of the wet air in a helix.

Accordingly, the wet air may have a large contact area with the bundles of hollow fiber membranes 100 and may exchange moisture with the bundles of hollow fiber membranes 100 over a wide area inside the housing 200.

The plurality of guide plates 310 may have the coolant passages therein, through which coolant flows.

The plurality of guide plates 310 may include, in the centers thereof, the guide holes 311 through which the bundles of hollow fiber membranes 100 pass.

The number of guide holes 311 may correspond to the number of bundles of hollow fiber membranes 100a, 100b, 100c, and 100d.

The guide member 300 may include a coolant inlet 321 through which coolant is introduced into the guide member 300 and a coolant outlet 323 through which the coolant is discharged from the guide member 300.

The coolant inlet 321 may be connected to the reaLmost guide plate of the plurality of guide plates 310.

The coolant outlet 323 may be connected to the foremost guide plate of the plurality of guide plates 310.

The guide member 300 may have an empty space therein, which serves as a coolant passage through which the coolant flows.

One end of the coolant passage may be in communication with the coolant inlet 321 such that the coolant is introduced into the coolant passage, and an opposite end of the coolant passage may be in communication with the coolant outlet 323 such that the coolant is discharged from the coolant passage.

Although not illustrated, the coolant passage may be formed in only a partial area of each guide plate 310 to cool the guide plate 310 by the thermal conduction, without having to be formed over the entire area in the guide plate 310.

For example, each of the plurality of guide plates 310 may have an inner space near the center thereof, which serves as a coolant passage. Peripheral sections of the guide plates 310 may be cooled by heat transfer to the housing 200 in proximity to the peripheral sections, whereas it is hard to expect that central sections of the guide plates 310 offer such a cooling effect. Therefore, cooling performance may be improved by cooling the central sections of the guide plates 310 with coolant.

In another example, each of the plurality of guide plates 310 may have a coolant passage formed over the entire area in the guide plate 310. That is, the coolant passage may be formed inside the guide plate 310 to surround the guide holes 311. Accordingly, the guide member 300 may be effectively cooled by coolant, which leads to effective cooling of the interior of the housing 200, thereby further promoting condensation of the exhaust gas. In addition, a large amount of condensate may be produced and absorbed into the hollow fiber membranes to effectively humidify the intake gas.

Referring to FIGS. 2 and 3, dry air (e.g., an intake gas to be introduced into the fuel cell stack) may be introduced into the hollow fiber membranes through the front ends thereof and may be discharged from the hollow fiber membranes through the rear ends thereof.

Wet air (e.g., an exhaust gas discharged from the fuel cell stack) may be introduced into the housing 200 through the exhaust gas inlet 211 and may be discharged from the housing 200 through the exhaust gas outlet 213.

The exhaust gas inlet 211 may be located closer to the intake gas outlets (that is, the rear ends of the bundles of hollow fiber membranes 100) than the intake gas inlets (that is, the front ends of the bundles of hollow fiber membranes 100), and the exhaust gas outlet 213 may be located closer to the intake gas inlets than the intake gas outlets. That is, the exhaust gas inlet 211 may be located closer to the rear end 203 of the housing 200 than the front end 201 thereof, and the exhaust gas outlet 213 may be located closer to the front end 201 of the housing 200 than the rear end 203 thereof.

Accordingly, the flow direction of the dry air inside the housing 200 (from front to back) may be opposite the flow direction of the wet air inside the housing 200 (from back to front), which makes it possible to facilitate moisture exchange between the wet air and the dry air.

For example, wet air introduced into the housing 200 through the rear end 203 thereof may meet humidified dry air, and moisture in the wet air may infiltrate into the dry air due to the difference in humidity and temperature. Furthermore, the wet air may humidify dry air while flowing inside the housing 200, after which the wet air may reach the front end 201 of the housing 200 to meet non-humidified dry air. At this time, moisture in the wet air may infiltrate into the non-humidified dry air since the wet air has a higher humidity than the incoming dry air even though the wet air has slightly lost moisture.

Therefore, the exhaust gas inlet 211 may be disposed as close as possible to the rear end 203 of the housing 200 and the exhaust gas outlet 213 be disposed as close as possible to the rear end 201 of the housing 200.

The coolant inlet 321 through which coolant is introduced into the guide member 300 may be located closer to the exhaust gas inlet 211 than the exhaust gas outlet 213. The coolant outlet 323 through which the coolant is discharged from the guide member 300 may be located closer to the exhaust gas outlet 213 than the exhaust gas inlet 211. That is, the coolant inlet 321 may be located closer to the rear end 203 of the housing 200 than the front end 201 thereof, and the coolant outlet 323 may be located closer to the front end 201 of the housing 200 than the rear end 203 thereof.

Accordingly, wet air may flow from back to front inside the housing 200, and coolant may flow through the guide member 300 from back to front to effectively cool the wet air.

The guide member 300 may be consistently cooled by coolant and may serve to lower the temperature inside the housing 200. Accordingly, the guide member 300 may raise the relative humidity inside the housing 200, thereby promoting condensation of an exhaust gas.

In addition, since the guide member 300 is consistently cooled by coolant, wet air (or an exhaust gas) in contact with the guide member 300 may be easily condensed on the guide member 300. Further, the guide member 300 may further lower the ambient temperature, thereby promoting condensation of the wet air on the surface of the guide member 300.

The guide member 300 with a helical shape may allow wet air (or an exhaust gas) inside the housing 200 to flow around and along the guide member 300 in a helix. In this case, condensate on a lower side of the housing 200 may be pushed up by the flow of the wet air.

Referring to FIG. 4, for example, when an exhaust gas is condensed on the surface of the guide member 300, the condensate on the surface of the guide member 300 may also be attracted by the exhaust gas flow in the direction in which the exhaust gas flows. Thus, the condensate may be easily infiltrated into the bundles of hollow fiber membranes 100.

A humidifier in the related art has a problem in that condensate is collected on a lower side of the humidifier. However, in the humidifier 10 according to the present disclosure, the guide member 300 may guide a flow of wet air, and condensate may be attracted toward an upper side of the humidifier 10 by the wet air flow. As a result, the amount of condensate used for humidification may be maximized.

In an embodiment, the flow speed of wet air that flows inside the housing 200 may vary with the intervals L1 between the adjacent guide plates 310 (see FIG. 3). The flow speed variation is based on Bernoulli's principle. Bernoulli's principle states that the flow speed and the cross-sectional area of a flow passage are inversely proportional to each other when the flow rate is constant.

For example, with a decrease in the intervals between the adjacent guide plates 310, the cross-sectional area of the exhaust gas passage 330 inside the housing 200 may decrease, and thus, the flow speed of an exhaust gas may increase. As described above, in order to increase an effect of pushing condensate up by an exhaust gas flow, the higher the flow speed of the exhaust gas, the better.

Although not illustrated, a surface of the guide member 300 may be processed to have a hydrophilic property.

For example, a bumpy structure may be formed on the surface of the guide member 300 to promote condensation of an exhaust gas and cause the condensate to remain on the surface of the guide member 300 without falling to the bottom of the housing 200.

In another example, the guide member 300 may be electrically or chemically processed such that a surface of the guide member 300 has a hydrophilic functional group. The guide member 300 may be electrically or chemically processed to have an oxygen functional group. Here, when the surface of the guide member 300 has a hydrophilic property, it means that the surface of the guide member 300 has a property of forming a larger attraction force with water than oil or other hydrophobic solvents.

Referring to FIG. 5, the bundles of hollow fiber membranes 100 may include four bundles of hollow fiber membranes 100a, 100b, 100c, and 100d spaced at predetermined intervals from each other. The four bundles of hollow fiber membranes 100a, 100b, 100c, and 100d may be radially separated from each other by a predetermined angle (e.g., an angle of 90 degrees in FIG. 5) and may be fixed to the housing 200 by the potting layers 400a and 400b.

Each of the bundles of hollow fiber membranes 100 may have hundreds to thousands of hollow fiber membranes bonded together.

In the process of manufacturing the humidifier 10, the plurality of bundles of hollow fiber membranes 100 may be fixed by the guide member 300 and may then be fixedly bonded to the housing 200 by the potting layers 400*a* and 400*b* at opposite ends thereof.

Accordingly, the humidifier 10 according to an embodiment of the present disclosure may solve the problem that hollow fiber membranes are biased to a side of the housing 200, instead of being arranged in a plurality of bundles.

The above-configured fuel cell humidifier of the present disclosure restricts the bundles of hollow fiber membranes from moving inside the housing by the guide member, thereby preventing deterioration in the performance of the humidifier due to a movement of the bundles of hollow fiber membranes to a side of the housing. That is because a specific part of the bundles of hollow fiber membranes makes more contact with a high-humidity exhaust gas, but the rest makes less contact with the exhaust gas when the bundles of hollow fiber membranes, through which an intake gas to be humidified flows, are biased to a side of the housing.

In addition, the fuel cell humidifier of the present disclosure is configured such that coolant flows through the guide member to cool an exhaust gas, thereby promoting condensation of the exhaust gas. As a result, the fuel cell humidifier can increase the amount of condensate produced therein and can improve humidification performance by infiltration of the condensate into an intake gas through the bundles of hollow fiber membranes.

Effects of the present disclosure are not limited to the aforementioned effects, and any other effects not mentioned herein will be clearly understood from the accompanying claims by those skilled in the art to which the present disclosure pertains.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A humidifier for a fuel cell, the humidifier comprising:
a bundle of hollow fiber membranes disposed inside the humidifier, such that an intake gas flows inside the bundle of hollow fiber membranes;
a housing configured to accommodate the bundle of hollow fiber membranes, such that an exhaust gas, which has a humidity higher than that of the intake gas, flows inside the housing; and
a guide member disposed in the housing to restrict a movement of the bundle of hollow fiber membranes inside the housing,
wherein coolant flows through the guide member to cool the exhaust gas to promote condensation of the exhaust gas.

2. The humidifier of claim 1, wherein the guide member guides the exhaust gas such that the exhaust gas flows across the bundle of hollow fiber membranes at least once inside the housing.

3. The humidifier of claim 1, wherein the housing extends in a direction in which the bundle of hollow fiber membranes extends, and
wherein the guide member extends inside the housing in the direction in which the housing extends.

4. The humidifier of claim 3, wherein the guide member has a helical shape along an inner surface of the housing.

5. The humidifier of claim 4, wherein the guide member includes a plurality of guide plates which extends in a direction transverse to the bundle of hollow fiber membranes and each of which has a coolant passage inside, and
wherein the plurality of guide plates are sequentially connected in a screw shape and have an exhaust gas passage between the plurality of guide plates, such that the exhaust gas inside the housing helically flows along the inner surface of the housing.

6. The humidifier of claim 5, wherein each of the plurality of guide plates has, in a center thereof, a guide hole through which the bundle of hollow fiber membranes passes through.

7. The humidifier of claim 6, wherein the bundle of hollow fiber membranes includes a plurality of bundles of hollow fiber membranes, and
wherein each of the plurality of guide plates has as many guide holes as the plurality of bundles of hollow fiber membranes.

8. The humidifier of claim 5, wherein the plurality of guide plates have a hydrophilic property.

9. The humidifier of claim 8, wherein each of the plurality of guide plates has an uneven outer surface.

10. The humidifier of claim 3,
wherein the housing includes:
an exhaust gas inlet guiding the exhaust gas into the housing; and
an exhaust gas outlet guiding the exhaust gas to be discharged from the housing,
wherein the guide member includes:
a coolant inlet through which coolant is introduced into the guide member; and
a coolant outlet through which the coolant is discharged from the guide member, and
wherein the coolant inlet is located closer to the exhaust gas inlet than the exhaust gas outlet, and the coolant outlet is located closer to the exhaust gas outlet than the exhaust gas inlet.

11. The humidifier of claim 1,
wherein the housing includes:
an exhaust gas inlet guiding the exhaust gas into the housing; and
an exhaust gas outlet guiding the exhaust gas to be discharged from the housing,
wherein the bundle of hollow fiber membranes includes:
intake gas inlets through which the intake gas is introduced into the hollow fiber membranes; and
intake gas outlets through which the intake gas is discharged from the hollow fiber membranes, and
wherein the exhaust gas inlet is located closer to the intake gas outlets than the intake gas inlets, and the exhaust gas outlet is located closer to the intake gas inlets than the intake gas outlets.

12. The humidifier of claim 1, further comprising:
potting layers configured to fix opposite ends of each of the bundle of hollow fiber membranes to the housing.

13. A humidifier for a fuel cell, the humidifier comprising:
a bundle of hollow fiber membranes disposed therein such that an intake gas flows inside the bundle of hollow fiber membranes;
a housing accommodating the bundle of hollow fiber membranes, such that an exhaust gas, which has a higher humidity than the intake gas, flows inside the housing; and a guide member disposed in the housing to restrict a movement of the bundle of hollow fiber membranes inside the housing, wherein the guide member includes a plurality of guide plates, which extend in a direction transverse to the bundle of hollow fiber membranes and each of which has a coolant passage inside, wherein the plurality of guide plates are sequentially connected together in a screw shape and each of the plurality of guide plates has an exhaust gas passage therebetween, and wherein the guide member guides the exhaust gas to helically flow along an inner surface of the housing.

14. The humidifier of claim 13, wherein the housing has a cylindrical inner space, and wherein each of the plurality of guide plates has a size corresponding to the inner space of the housing and guides the exhaust gas inside the housing such that the exhaust gas helically flows along the inner surface of the housing.

\* \* \* \* \*